United States Patent
Suda et al.

(10) Patent No.: US 12,539,504 B2
(45) Date of Patent: Feb. 3, 2026

(54) PARTICLE, METHOD FOR PRODUCING PARTICLE, AFFINITY PARTICLE, AND REAGENT AND KIT INCLUDING THE SAME

(71) Applicant: CANON KABUSHIKI KAISHA, Tokyo (JP)

(72) Inventors: Sakae Suda, Kanagawa (JP); Kazumichi Nakahama, Tokyo (JP); Fumio Yamauchi, Kanagawa (JP); Kengo Kanazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1410 days.

(21) Appl. No.: 17/078,825

(22) Filed: Oct. 23, 2020

(65) Prior Publication Data

US 2021/0101130 A1 Apr. 8, 2021

Related U.S. Application Data

(63) Continuation of application No. PCT/JP2019/017537, filed on Apr. 25, 2019.

(30) Foreign Application Priority Data

Apr. 27, 2018 (JP) .................. 2018-087518

(51) Int. Cl.
| | | |
|---|---|---|
| *G01N 33/531* | (2006.01) | |
| *B01J 20/26* | (2006.01) | |
| *B01J 20/28* | (2006.01) | |
| *C08F 2/22* | (2006.01) | |
| *C08F 8/34* | (2006.01) | |
| *C08F 212/36* | (2006.01) | |
| *C08F 220/14* | (2006.01) | |
| *C08F 220/32* | (2006.01) | |
| *C08F 265/06* | (2006.01) | |
| *C08K 5/315* | (2006.01) | |
| *G01N 33/547* | (2006.01) | |

(52) U.S. Cl.
CPC ....... *B01J 20/265* (2013.01); *B01J 20/28016* (2013.01); *C08F 2/22* (2013.01); *C08F 8/34* (2013.01); *C08F 212/36* (2013.01); *C08F 220/14* (2013.01); *C08F 220/325* (2020.02); *C08K 5/315* (2013.01); *G01N 33/547* (2013.01)

(58) Field of Classification Search
CPC ...... B01J 20/265; B01J 20/28016; C08F 2/22; C08F 8/34; C08F 212/36; C08F 220/14; C08F 220/325; C08F 8/30; C08F 265/04; C08F 265/06; C08K 5/315; G01N 33/547; G01N 33/531
See application file for complete search history.

(56) References Cited

U.S. PATENT DOCUMENTS

2007/0099814 A1 5/2007 Tamori
2022/0163535 A1* 5/2022 Natori .................. G01N 33/543

FOREIGN PATENT DOCUMENTS

| CN | 105992949 A | 10/2016 |
|---|---|---|
| CN | 106459141 A | 2/2017 |
| EP | 3076170 A1 | 10/2016 |
| EP | 3162809 A1 | 5/2017 |
| GB | 2184732 A | 7/1987 |
| JP | S60-004501 A | 1/1985 |
| JP | H02-001795 A | 1/1990 |
| JP | H04-218772 A | 8/1992 |
| JP | H10-183474 A | 7/1998 |
| JP | 2008-007688 A | 1/2008 |
| JP | 2014-152163 A | 8/2014 |
| JP | 2014-153140 A | 8/2014 |
| JP | 2014-193972 A | 10/2014 |
| WO | 2015/080174 A1 | 4/2015 |
| WO | 2019208672 A1 | 10/2019 |

OTHER PUBLICATIONS

Cai et al. "Gold nanoparticles as intermediate ligands for polymer monolithic capillary microextraction of trace rare earth elements followed by inductively coupled plasma mass spectrometry detection", Spectrochimica Acta Part B, vol. 127, 2017, pp. 56-63, published Nov. 26, 2016. (Year: 2016).*
Yukio, I., "Bioseparation using affinity latex", Mar. 23, 1995, pp. 11-30.
Bayramoglu, G., et al., "Poly(methyl methacrylate-glycidiyl methacrylate) Film with Immobilized Iminodiacetic Acid and Cu (II) Ion: For Protein Adsorption", Fibers and Polymers, Dec. 30, 2012, pp. 1225-1232, vol. 13, No. 10.
Zhou, Y., et al., "Synchronized purification and immobilization of his-tagged [beta]-glucosidase via Fe3 O4/PMG core/shell magnetic nanoparticles," Scientific Reports, Jan. 30, 2017, vol. 7, No. 1.
Altintas, E., et al., "Hemoglobin binding from human blood hemolysate with poly(glycidyl methacrylate) beads", Collids and Surfaces B: Biointerfaces, Feb. 24, 2011, pp. 235-240, vol. 85, No. 2.

* cited by examiner

*Primary Examiner* — Shafiqul Haq
*Assistant Examiner* — Nam P Nguyen
(74) *Attorney, Agent, or Firm* — Canon U.S.A., Inc. IP Division

(57) ABSTRACT

A particle includes a copolymer including a repeating unit A having, in a side chain, a sulfide group or a secondary amine, and three or more hydroxy groups, and a repeating unit B having, in a side chain, at least one reactive functional group for binding a ligand, in which nonspecific adsorption is suppressed.

17 Claims, No Drawings

PARTICLE, METHOD FOR PRODUCING PARTICLE, AFFINITY PARTICLE, AND REAGENT AND KIT INCLUDING THE SAME

CROSS-REFERENCE TO RELATED APPLICATIONS

This application is a Continuation of International Patent Application No. PCT/JP2019/017537, filed Apr. 25, 2019, which claims the benefit of Japanese Patent Application No. 2018-087518, filed Apr. 27, 2018, both of which are hereby incorporated by reference herein in their entirety.

BACKGROUND OF THE INVENTION

Field of the Invention

The present invention relates to a particle, a method for producing a particle, an affinity particle, a test reagent and a test kit that include the affinity particle, and a method for detecting a target substance.

Background Art

In recent years, purification and quantification of a target substance have been widely studied by using an affinity particle formed by a particle and a ligand having a compatibility with the target substance that are chemically bound to each other. Particles used for this purpose are desired to have a low property of adsorbing to substances other than the target substance, so-called nonspecific adsorption property. For example, Non-Patent Literature 1 discloses resin particles that are obtained by emulsion polymerization using two monomers of styrene and glycidyl methacrylate and that have surfaces covered with polyglycidyl methacrylate (hereinafter, SG particles). Patent Literature 1 (Japanese Patent Laid-Open No. 2014-193972) discloses a method for controlling a particle size of an SG particle.

In SG particles, some of epoxy groups derived from polyglycidyl methacrylate are ring-opened to form a glycol, and hydrophilicity of this glycol reduces the nonspecific adsorption. Meanwhile, in the case of chemically binding a ligand to the surfaces of SG particles, it is also possible to use epoxy groups derived from polyglycidyl methacrylate without further treatment. However, a method including the steps of converting an epoxy group to another reactive functional group such as a carboxyl group, an amino group, or a thiol group and subsequently causing the reactive functional group to chemically react with a ligand is usually employed. In particular, particles obtained by converting epoxy groups of SG particles to carboxyl groups are a preferred form because such particles have high versatility in terms of chemically binding a ligand to the particle surfaces.

In recent years, a latex agglutination immunoassay has attracted attention as a simple and fast immunoassay. This method includes mixing a dispersion liquid of particles including, as a ligand, an antibody or antigen that is chemically bound thereto with a specimen that may contain a target substance (an antigen or antibody). At this time, if the target substance (the antibody or antigen) is contained in the specimen, an agglutination reaction of the particles occurs. Therefore, the presence or absence of a disease can be specified by optically detecting this agglutination reaction as an amount of change in, for example, the scattered light intensity, the transmitted light intensity, or the absorbance. The particles used in the latex agglutination immunoassay preferably have, as in SG particles, a low nonspecific adsorption capability and a reactive functional group for immobilizing a ligand in order to reduce misleading noise.

CITATION LIST

Patent Literature

PTL1: Japanese Patent Laid-Open No. 2014-193972
PTL2: Japanese Patent Laid-Open No. 2014-153140

Non-Patent Literature

NPL1: Bioseparation using affinity latex (1995) pp. 11-30

The inventors of the present invention synthesized SG particles in accordance with Non-Patent Literature 1 (Bioseparation using affinity latex (1995) pp. 11-30) and further caused epoxy groups derived from glycidyl methacrylate included in the SG particles to chemically react with an amino acid to obtain particles in which the epoxy groups were converted into carboxyl groups. However, the particles obtained as described above had a degraded capability to suppressing nonspecific adsorption compared with the SG particles. Meanwhile, a method for introducing carboxyl groups on SG particles is known. In this method, such particles are obtained by treating SG particles with an aqueous ammonia, subsequently causing the treated particles to chemically react with ethylene glycol diglycidyl ether, and further causing epoxy groups derived from the ethylene glycol diglycidyl ether to chemically react with an amino acid. The particles obtained in this manner suppress nonspecific adsorption. However, since the particles exhibit excessive dispersion stability, the particles are unlikely to agglutinate, and a sufficient sensitivity may not be obtained when the particles are used in the latex agglutination immunoassay. Furthermore, there is also a problem in that the chemical reaction process is performed in multiple stages and is complicated, which is not suitable for industrialization.

SUMMARY OF THE INVENTION

The present invention has been made in view of the background art and the problems. Specifically, an object of the present invention is to provide a particle having a high capability to suppressing nonspecific adsorption and having a reactive functional group for chemically binding a ligand to the surface of the particle. Another object is to provide a novel method for producing the particle simply at a high yield.

The particle according to the present invention is characterized by including a copolymer including a repeating unit A having, in a side chain, a sulfide group or a secondary amine, and three or more hydroxy groups, and a repeating unit B having, in a side chain, at least one reactive functional group for binding a ligand, in which nonspecific adsorption is suppressed by the hydroxy groups present on a surface.

The method for producing a particle according to the present invention is including:

a step of forming a particulate copolymer by mixing glycidyl (meth)acrylate, styrene or methyl (meth)acrylate, water, and a radical polymerization initiator to obtain an aqueous dispersion of the particulate copolymer (step 1); and a step of mixing the aqueous dispersion and a radical-polymerizable monomer having a thiol group to prepare a liquid mixture, and causing an epoxy group derived from glycidyl (meth)acrylate of the particulate copolymer to react with the thiol group (step 2).

Further features of the present invention will become apparent from the following description of exemplary embodiments.

DESCRIPTION OF THE EMBODIMENTS

Hereafter, embodiments of the present invention will be described in detail; however, the technical scope of the present invention is not limited to the embodiments.

(Particle)

Particles according to an embodiment of the present invention will be described.

A particle according to this embodiment includes a copolymerization including a repeating unit A having, in a side chain, a sulfide group or a secondary amine, and three or more hydroxy groups, and a repeating unit B having, in a side chain, at least one reactive functional group for binding a ligand. Hydroxy groups present on the surface of the particle mainly suppresses nonspecific adsorption. Since the particle according to the embodiment has three or more hydroxy groups, the particle has very high hydrophilicity and has a high capability to suppressing nonspecific adsorption.

(Reactive Functional Group)

The reactive functional group according to this embodiment is a functional group that binds (for example, chemically binds) to a ligand and is not particularly limited within a range in which the objects of the present invention can be achieved. Examples of the reactive functional group in this embodiment include an amino group, a thiol group, an active ester group, and a carboxyl group; however, the present invention is not limited thereto. Considering versatility and stability to the functional group, the reactive functional group in this embodiment is preferably a carboxyl group.

The reactive functional group included in the repeating unit B in the embodiment is preferably a carboxyl group, and the repeating unit B preferably has two or more carboxyl groups. The two or more carboxyl groups in the side chain provide good reaction efficiency with the ligand. Furthermore, when carboxyl groups are present very close to each other in this manner, the carboxyl groups interact with each other to suppress dissociation, and thus dispersion stability to the particles becomes moderately unstable. Accordingly, the use of the particles in the latex agglutination immunoassay is advantageous to detect a target substance at a high sensitivity.

(Repeating Unit B)

Furthermore, the "repeating unit B" in this embodiment preferably has a chemical structure represented by general formula (2) below. In general formula (2), $R_2$ represents H (hydrogen) or $CH_3$ (a methyl group), L4 to L6 each independently represent a direct bond or an alkylene group having 1 to 3 carbon atoms. X represents S (a sulfide group) or NH (a secondary amine) General formula (2) in this embodiment is more preferably represented by formula (2-i) below. In formula (2-i), $R_4$ is H (hydrogen) or $CH_3$ (a methyl group), and X is S (a sulfide group) or NH (a secondary amine) When the repeating unit B in the embodiment has such a chemical structure, the above-described interaction between carboxyl groups becomes most significant.

General formula (2)

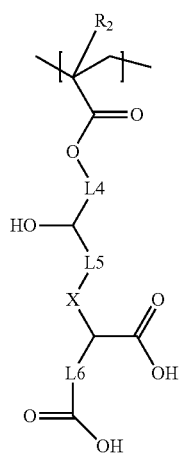

[Chem. 1]

Formula (2-i)

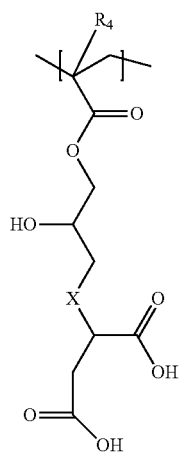

[Chem. 2]

(Repeating Unit A)

The particle in this embodiment is characterized by including a repeating unit A having three or more hydroxy groups. The chemical structure of the repeating unit A is not particularly limited within a range in which the objects of the present invention can be achieved, but is preferably a chemical structure represented by general formula (1) below. In general formula (1), $R_1$ represents H (hydrogen) or $CH_3$ (a methyl group), L1 to L3 each independently represent a direct bond or an alkylene group having 1 to 3 carbon atoms. When the repeating unit A has the chemical structure represented by general formula (1), the chemical structure is poor in terms of hydrophilicity compared with a chemical structure obtained by ring-opening of epoxy groups derived from glycidyl methacrylate of SG particles. However, studies conducted by the inventors of the present invention have made clear that, regarding the capability to suppressing nonspecific adsorption, the chemical structure represented by general formula (1) is substantially the same as or better than the above chemical structure obtained by ring-opening of epoxy groups. In this embodiment, general formula (1) below is particularly preferably represented by formula (1-i) below. In formula (1-i), $R_3$ represents H or $CH_3$, and X represents S or NH.

General formula (1)

[Chem. 3]

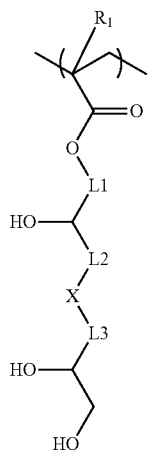

Formula (1-i)

[Chem. 4]

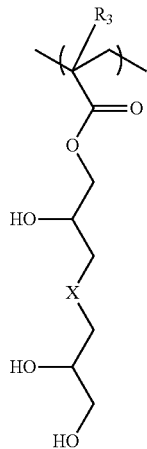

When the particle in this embodiment includes a repeating unit A represented by formula (1-i) and a repeating unit B represented by formula (2-i), nonspecific adsorption is most significantly suppressed, and the best reaction efficiency for the ligand is exhibited. Furthermore, appropriate dispersion stability to the particles is also provided when the particles are used in a latex agglutination immunoassay. A ratio "repeating unit A"/"repeating unit B" is preferably 1 or more and 30 or less (mole fraction) and more preferably 2 or more and 20 or less (mole fraction). If the ratio is less than 1 (mole fraction), the proportion of the reactive functional group in the particles is excessively high, and dispersion stability to the particles may be degraded more than necessary. In addition, when the reactive functional groups of the particles are chemically bound to the ligand, unreacted reactive functional groups may interact with the ligand, resulting in denaturation of the ligand. If the ratio is more than 30, the reaction efficiency in the chemical reaction between a reactive functional group of particles and the ligand may be insufficient.

(Repeating Unit C)

The particle in this embodiment preferably includes a copolymer further including a hydrophobic repeating unit C that is added to the repeating unit A having, in a side chain, a sulfide group or a secondary amine, and three or more hydroxy groups, and the repeating unit B having, in a side chain, at least one reactive functional group for binding a ligand. When the copolymer further includes the hydrophobic repeating unit C, the particle becomes physically strong, and breaking and chipping are suppressed even when a centrifugal operation is repeated, compared with a particle that includes a copolymer including only the repeating unit A and the repeating unit B.

The chemical structure of the hydrophobic repeating unit C in this embodiment is not limited within a range in which the objects of the present invention can be achieved, but is preferably at least one selected from the group derived from styrenes and (meth)acrylates. Specifically, the repeating unit C is preferably at least one selected from repeating units constituting polymers of styrenes and repeating units constituting polymers of (meth)acrylates. The repeating unit C derived from styrene or methyl methacrylate, or both styrene and methyl methacrylate is preferred because the repeating unit C has a high glass transition temperature, and the particle has sufficient strength. Examples of styrenes and (meth)acrylates that can be used as the "repeating unit C" in this embodiment will be listed below. However, the "repeating unit C" in the embodiment is not limited thereto. Two or more oily radical-polymerizable monomers may be used as the hydrophobic "repeating unit C".

Styrenes: styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, and the like.

(Meth)acrylates: methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxy ethyl acrylate, methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, dibutyl phosphate ethyl methacrylate, and the like.

When the hydrophobic repeating unit C is used, a composition ratio with the repeating unit B is not limited within a range in which the objects of the present invention can be achieved. Preferably, a ratio ["repeating unit A"+"repeating unit B"]/["repeating unit C"] is 1 or more and 30 or less (mole fraction), preferably 2 or more and 15 or less (mole fraction), and more preferably 2 or more and 7 or less (mole fraction). This preferred range includes numerical values determined by the relation among the capability to suppressing nonspecific adsorption, the capability being derived from the "repeating unit A" of the particle, the reaction efficiency of the chemical reaction between the ligand and the reactive functional group derived from the "repeating unit B", and the strength of the particle. When the above relation is satisfied, the capability to suppressing nonspecific adsorption, the capability being exhibited by the particle, and the strength of the particle are well-balanced.

(Particle Size)

Particles in this embodiment have a particle size of 0.05 µm or more and 1 µm or less, preferably 0.1 µm or more and 0.5 µm or less, and more preferably 0.15 µm or more and 0.3 µm or less in terms of the number-average particle size in water. When the particle size is 0.15 µm or more and 0.3 µm or less, the particles have good handleability in a centrifugal operation, and the magnitude of the non-surface area, which is a characteristic of the particles, is outstanding. The particle size of the particles in this embodiment is evaluated by a dynamic light-scattering method.

(Ligand/Affinity Particle)

This embodiment can provide an affinity particle having a particle according to the embodiment and a ligand that is chemically bound to a carboxyl group included in (derived from) the repeating unit A.

In this embodiment, the ligand refers to a compound that specifically binds to a receptor included in a specific target substance. The site where the ligand binds to the target substance is predetermined and selectively or specifically has a high compatibility. Examples of the ligand in the embodiment include, but are not limited to, antigens and antibodies, enzyme proteins and substrates thereof, signal substances such as hormones and neurotransmitters and receptors thereof, and nucleic acids. Examples of the nucleic acids include deoxyribonucleic acids. The affinity particle in this embodiment selectively or specifically has a high compatibility with (affinity for) a target substance. The ligand in the embodiment is preferably any one of an antibody, an antigen, and a nucleic acid.

In this embodiment, a chemical reaction method for chemically binding a ligand to a reactive functional group derived from the "repeating unit A" in the particle in the embodiment may be an existing known method within a range in which the objects of the present invention can be achieved. For example, in the case where the reactive functional group in the embodiment is a carboxyl group, a carbodiimide-mediated reaction and an NHS ester activation reaction are chemical reaction methods that are often employed. However, the chemical reaction method for chemically binding a ligand to a carboxyl group derived from the "repeating unit A" in the particle according to the embodiment of the present invention is not limited thereto. When the ligand is bound through an amide bond, a catalyst such as 1-[3-(dimethylaminopropyl)-3-ethylcarbodiimide] can be optionally used.

In the case where affinity particles in the embodiment use an antibody (antigen) as the ligand and uses an antigen (antibody) as the target substance, the affinity particles can be preferably applied to a latex agglutination immunoassay, which is widely used in the fields of, for example, clinical tests and biochemical studies. In the case where common particles are applied to the latex agglutination immunoassay, an antigen (antibody) which is a target substance, foreign substances in the serum, and the like may nonspecifically adsorb to the surfaces of the particles. The detection of unintended particle agglutination due to this nonspecific adsorption results in a problem of disturbance of accurate measurement (generation of misleading noise).

Therefore, for the purpose of reducing misleading noise, the particles are usually coated with a biological substance, such as albumin, serving as a blocking agent to suppress nonspecific adsorption on the surfaces of the particles, and used. However, such a biological substance has a characteristic that is slightly different depending on the lot. Accordingly, in the particles coated with the biological substance, the capability to suppressing nonspecific adsorption is different for each coating treatment. Therefore, it is difficult to stably supply particles having the same level of capability to suppressing nonspecific adsorption. Furthermore, such a biological substance covering the surfaces of the particles may exhibit hydrophobicity due to denaturation and does not necessarily have a good capability to suppressing nonspecific adsorption. In addition, biotic contamination is also considered as a problem.

Patent Literature 2 (Japanese Patent Laid-Open No. 2014-153140) discloses an affinity particle used for in-vitro diagnosis, characterized by being obtained by coating a particle with, as a blocking agent, a polymer that includes a repeating unit having a sulfenyl group in a side chain thereof. However, since the polymer that includes a repeating unit having a sulfenyl group in a side chain thereof is water-soluble, and the surface of the particle is coated by physical adsorption, there is a concern that the polymer is inherently isolated by dilution. In addition, the inventors obtained SG particles by the method described in Non-Patent Literature 1, obtained, by the method described in Patent Literature 2, particles in which the polymer was adsorbed on polystyrene particles, and, for these particles, the capability to suppressing nonspecific adsorption in a chyle was evaluated.

Regarding the particles obtained by the method described in Patent Literature 2, the polymer including a repeating unit having a sulfenyl group in a side chain thereof was obtained by soap-free emulsification polymerization.

According to the results, the SG particles exhibited a better capability to suppressing nonspecific adsorption, although there is a possibility that Non-Patent Literature 1 could not be completely repeated. Here, the SG particles are particles in which epoxy groups derived from glycidyl methacrylate are converted to a glycol by heating in an acidic aqueous solution.

(Test Reagent for In-Vitro Diagnosis)

A test reagent for in-vitro diagnosis, that is, a test reagent used to detect a target substance in a specimen by in-vitro diagnosis in this embodiment contains affinity particles in the embodiment and a dispersion medium in which the affinity particles are dispersed. The amount of affinity particles according to the embodiment contained in the reagent in this embodiment is preferably 0.001% by mass to 20% by mass, and more preferably 0.01% by mass to 10% by mass. The reagent in this embodiment may contain third substances such as a solvent and a blocking agent besides the affinity particles in the embodiment within a range in which the objects of the present invention can be achieved. The reagent may contain a combination of two or more of the third substances such as a solvent and a blocking agent. Examples of the solvent used in the present invention include various buffer solutions such as phosphate buffer solutions, glycine buffer solutions, Good's buffer solutions, tris buffer solutions, and ammonia buffer solutions. However, the solvent contained in the reagent in this embodiment is not limited thereto.

(Test Kit)

A kit used to detect a target substance in a specimen by in-vitro diagnosis in this embodiment includes the reagent described above and a casing containing the reagent therein.

The kit in this embodiment preferably further includes, in addition to the reagent (hereinafter, Reagent 1) in the embodiment, a reaction buffer solution (hereinafter, Reagent 2) containing an albumin An example of the albumin is a serum albumin, and the albumin may be one that has been treated with a protease. As a guide, the amount of albumin contained in Reagent 2 is 0.001% by mass to 5% by mass; however, the kit in this embodiment is not limited thereto. One or both of Reagent 1 and Reagent 2 may contain a sensitizer for a latex agglutination assay. Examples of the sensitizer for a latex agglutination assay include polyvinyl alcohol, polyvinylpyrrolidone, and polyalginic acid. However, the present invention is not limited thereto. The kit in this embodiment may include, for example, a positive control, a negative control, and a serum diluent in addition to Reagent 1 and Reagent 2. As media of the positive control and the negative control, solvents may be used besides a serum containing no target substance which can be assayed and a physiological saline solution. The kit in this embodiment can be used in a method for detecting a target substance according to this embodiment as in kits used to detect a target substance in a specimen by ordinary in-vitro diagnosis. In addition, the concentration of the target substance can also be measured by an existing known method. In particular, the kit in this embodiment is suitable for use in detection of a target substance in a specimen by a latex agglutination assay.

(Detection Method)

A method for detecting a target substance in a specimen by in-vitro diagnosis in this embodiment includes mixing the affinity particles in the embodiment and a specimen with a possibility of containing a target substance. The mixing of the affinity particles in the embodiment and the specimen is preferably performed in a range of pH 3.0 to pH 11.0. The mixing temperature is in a range of 20° C. to 50° C., and the mixing time is in a range of 1 minute to 20 minutes. The detection method preferably uses a solvent. In the detection method of this embodiment, the concentration of the affinity particles in the embodiment is preferably 0.001% by mass to 5% by mass, and more preferably 0.01% by mass to 1% by mass in the reaction system. In the detection method of this embodiment, it is preferable to optically detect an agglutination reaction occurring as a result of the mixing of the affinity particles in the embodiment and the specimen, that is, to detect a target substance in the specimen by a latex agglutination assay. Specifically, the method includes a step of mixing a specimen with a test reagent to prepare a liquid mixture, a step of irradiating the liquid mixture with light, and a step of detecting at least one of transmitted light or scattered light of the light with which the liquid mixture is irradiated. The optical detection of the agglutination reaction occurring in the liquid mixture enables the target substance in the specimen to be detected and further enables the concentration of the target substance to be measured. The method for optically detecting the agglutination reaction may be a method of measuring an amount of change in, for example, the scattered light intensity, the transmitted light intensity, or the absorbance by using an optical device capable of detecting any of these values.

(Method for Producing Particle)

A method for producing particles according to this embodiment includes the following steps.

A step of forming a particulate copolymer by mixing glycidyl (meth)acrylate, styrene or methyl (meth)acrylate, water, and a radical polymerization initiator to obtain an aqueous dispersion of the particulate copolymer (step 1).

A step of mixing the aqueous dispersion and a radical-polymerizable monomer having a thiol group to prepare a liquid mixture, and causing an epoxy group derived from glycidyl (meth)acrylate of the particulate copolymer to react with the thiol group (step 2).

The radical-polymerizable monomer having a thiol group is preferably at least one of 3-mercapto-1,2-propanediol, mercaptosuccinic acid, and 3-mercaptopropionic acid.

The method for producing particles according to this embodiment preferably includes the following steps.

A particulate copolymer is formed by mixing glycidyl (meth)acrylate, styrene or methyl (meth)acrylate, water, and a radical polymerization initiator to obtain an aqueous dispersion of the particulate copolymer (step 1). The aqueous dispersion, 3-mercapto-1,2-propanediol, and mercaptosuccinic acid are mixed to prepare a liquid mixture. Subsequently, epoxy groups derived from glycidyl (meth)acrylate of the particulate copolymer are caused to react with thiol groups derived from 3-mercapto-1,2-propanediol and mercaptosuccinic acid (step 2).

The radical polymerization initiator is at least any one of 4,4'-azobis(4-cyanovaleric acid), 2,2'-azobis[2-methyl-N-(2-hydroxyethyl)propionamide, 2,2'-azobis[N-(2-carboxyethyl)-2-methylpropionamidine]tetrahydrate, 2,2'-azobis(2-methylpropionamidine)dihydrochloride, 2,2'-azobis[2-(2-imidazolin-2-yl)propane], 2,2'-azobis[2-(2-imidazolin-2-yl)propane]dihydrochloride, and 2,2'-azobis[2-(2-imidazolin-2-yl)propane]disulfate dihydrate.

The radical polymerization initiator is preferably any one of 2,2'-azobis[2-(2-imidazolin-2-yl)propane]dihydrochloride, 2,2'-azobis[2-(2-imidazolin-2-yl)propane]disulfate dihydrate, 2,2'-azobis(2-methylpropionamidine)dihydrochloride, and 2,2'-azobis[2-(2-imidazolin-2-yl)propane].

The method preferably includes a step of adjusting a pH of the liquid mixture in the step 2 to 0.1 or more and 9.0 or less by using an organic base having no primary amine The method for forming a particulate copolymer in this embodiment is not limited except for the use of radical polymerization within a range in which the objects of the present invention can be achieved. In radical polymerization, emulsion polymerization, soap-free emulsification polymerization, or suspension polymerization is preferably used, and emulsion polymerization or soap-free emulsification polymerization is more preferably used. Soap-free emulsification polymerization is still more preferably used. In general, emulsion polymerization and soap-free emulsification polymerization can provide a particulate polymer (copolymer) having a sharp particle size distribution compared with suspension polymerization. In addition, when a particle and a ligand are chemically bound to each other, there is a concern that the presence of an anionic surfactant, which is generally used in emulsion polymerization, may denature the ligand. Accordingly, the method for forming a particulate polymer in this embodiment is most preferably soap-free emulsification polymerization.

In the step 1 of the method for producing particles in this embodiment, a cross-linkable radical polymerization monomer is further preferably included besides glycidyl (meth)acrylate, and styrene or methyl (meth)acrylate. By incorporating the cross-linkable radical polymerization monomer, the resulting particulate copolymer becomes physically strong, and a concern about the occurrence of breaking and chipping is eliminated even when a centrifugal operation is repeated during purification.

Examples of the cross-linkable radical-polymerizable monomer that can be used in the present invention will be listed below. However, the present invention is not limited thereto. Two or more oily radical-polymerizable monomers may be used. Among the radical-polymerizable monomers listed as examples below, divinylbenzene is preferably used because of its good handleability during the radical polymerization reaction, although the reason for this is unclear.

Cross-linkable radical-polymerizable monomers: diethylene glycol diacrylate, triethylene glycol diacrylate, tetraethylene glycol diacrylate, polyethylene glycol diacrylate, 1,6-hexanediol diacrylate, neopentyl glycol diacrylate, tripropylene glycol diacrylate, polypropylene glycol diacrylate, 2,2'-bis(4-(acryloxydiethoxy)phenyl)propane, trimethylolpropane triacrylate, tetramethylolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis(4-(methacryloxy diethoxy)phenyl)propane, 2,2'-bis(4-(methacryloxy polyethoxy)phenyl)propane, trimethylolpropane trimethacrylate, tetramethylolmethane tetramethacrylate, divinylbenzene, divinylnaphthalene, divinyl ether, and the like.

The method for producing particles in this embodiment preferably further includes, in a process of forming the particulate polymer in the step 1, a step of further mixing glycidyl (meth)acrylate to cover a surface of the particulate copolymer with polyglycidyl (meth)acrylate.

The radical polymerization initiator is preferably at least any one of 4,4'-azobis(4-cyanovaleric acid), 2,2'-azobis[2-methyl-N-(2-hydroxyethyl)propionamide, 2,2'-azobis[N-(2-carboxyethyl)-2-methylpropionamidine]tetrahydrate, 2,2'-azobis(2-methylpropionamidine)dihydrochloride (V-50 (FUJIFILM Wako Pure Chemical Corporation)), 2,2'-azobis[2-(2-imidazolin-2-yl)propane], 2,2'-azobis[2-(2-imidazolin-2-yl)propane]dihydrochloride, and 2,2'-azobis[2-(2-imidazolin-2-yl)propane]disulfate dihydrate. This is for the purpose of preventing ring-opening of epoxy groups derived from glycidyl (meth)acrylate in the step 1 of obtaining the aqueous dispersion of the particulate copolymer. For example, when potassium persulfate is used as the radical polymerization initiator, the radical polymerization reaction field becomes acidic due to the influence of the initiator residue, and epoxy groups derived from glycidyl (meth)acrylate may react with water to form a glycol. When ammonium persulfate is used as the radical polymerization initiator, epoxy groups derived from glycidyl (meth)acrylate may react with ammonia. When an anionic radical polymerization initiator having a carboxyl group is used as the radical polymerization initiator, an epoxy group derived from glycidyl (meth)acrylate and the carboxyl group derived from the polymerization initiator react with each other, resulting in aggregation of the particulate copolymer. In order to avoid this aggregation, a method of forming the particulate copolymer at a temperature significantly lower than the 10-hour half-life temperature of the radical polymerization initiator is also considered. However, this is not suitable for industrialization because a large amount of radical polymerization initiator is necessary, and the radical polymerization time is prolonged.

The step 2 is a step of introducing a glycol and a carboxyl group into epoxy groups derived from glycidyl (meth)acrylate of the particulate copolymer. In general, an epoxy group easily reacts with an amino group, a carboxyl group, or a thiol group. When an epoxy group is caused to react with such a group in water, strongly basic conditions are selected because a chemical reaction between the epoxy group and water is dominant under acidic conditions. However, in the method for producing particles in this embodiment, since a cationic radical polymerization initiator is used in order to obtain a particulate copolymer, dissociation of the radical polymerization initiator residue is suppressed under the strongly basic conditions. As a result, dispersion of the particulate copolymer becomes unstable, and partial aggregation occurs, which may result in a decrease in the yield of the particles in this embodiment. The inventors have proposed a method of using 3-mercapto-1,2-propanediol and mercaptosuccinic acid as reagents for introducing a glycol and a carboxyl group into epoxy groups derived from glycidyl (meth)acrylate of the particulate polymer. That is, the inventors have found that intended particles are obtained without causing the partial aggregation by utilizing the fact that the chemical reaction between an epoxy group and a thiol group has higher reactivity than the chemical reaction between an epoxy group and an amino group or between an epoxy group and a carboxyl group. Specifically, the following was found. The particulate copolymer in this embodiment and these reagents are mixed under the condition of a pKa of the radical polymerization initiator residue or less and a pH of 0.1 or more, preferably a pH of 9 or less and 1 or more, and more preferably a pH of 7 or less and 3 or more. Subsequently, epoxy groups derived from glycidyl (meth)acrylate of the particulate copolymer and the above reagents are brought into contact with each other for a predetermined time to introduce a glycol and a carboxyl group onto the surface of the particulate copolymer, although the amount of introduction may be slight. Thus, the zeta potential of the particulate copolymer is reversed from positive to negative, and the pH of the reaction field in the step 2 is then readjusted to 11. Thus, the intended particles are obtained at a yield of about 100%.

In the step 2 of the method for producing particles in this embodiment, it is essential to use, as a reagent used to adjust the pH, an organic base having no primary amine. The use of an organic base having a primary amine is not preferred because the organic base itself chemically reacts with epoxy groups derived from glycidyl (meth)acrylate of the particulate copolymer. Alternatively, in the case where a metallic base such as sodium hydroxide or potassium hydroxide is used to adjust the pH, the carboxyl groups introduced on the surface of the particulate copolymer exhibit a metal salt structure. Consequently, the reaction efficiency significantly decreases when the resulting particles are chemically bound to a ligand. The organic base having no primary amine in this embodiment is not particularly limited within a range in which the objects of the present invention can be achieved. For example, pyridine, triethylamine, diazabicycloundecene, or 1,8-bis(dimethylamino)naphthalene is preferably used. Such organic bases may be used in combination of two or more thanreof.

EXAMPLES

The present invention will now be described in detail by using Examples. However, the present invention is not limited to these Examples.

Example 1

Synthesis of Particles 1

In a 200 mL flask, 1.2 g of styrene (Kishida Chemical Co., Ltd.), 1.8 g of glycidyl methacrylate (Kishida Chemical Co., Ltd.), 0.04 g of divinylbenzene (Kishida Chemical Co., Ltd.), and 100 g of ion-exchanged water were weighed to prepare a liquid mixture. Subsequently, the liquid mixture was maintained at 70° C. under stirring at 200 rpm, and nitrogen bubbling was performed for 30 minutes. Next, the nitrogen bubbling was switched to a nitrogen flow. A solution that had been separately prepared by dissolving 0.06 g of V-50 (FUJIFILM Wako Pure Chemical Corporation) in 3 g of pure water was added to the liquid mixture to initiate radical polymerization (soap-free emulsification polymerization). After two hours from the initiation of the polymerization, 0.3 g of glycidyl methacrylate was added to the radical polymerization reaction field, and the resulting reaction mixture was further maintained at 70° C. for eight hours under stirring at 200 rpm and then slowly cooled to room temperature. At this time, the content in the 200 mL flask was sampled, and the radical polymerization conversion was evaluated by proton NMR, gas chromatography, and gel permeation chromatography. According to the results, it was confirmed that the radical polymerization conversion was substantially 100%. Next, an aqueous solution that had been prepared in advance by dissolving 3-mercapto-1,2-propanediol (FUJIFILM Wako Pure Chemical Corporation) and mercaptosuccinic acid (FUJIFILM Wako Pure Chemical Corporation) (where the ratio of 3-mercapto-1,2-propanediol to mercaptosuccinic acid was 9:1 (mole fraction), the total number of moles of 3-mercapto-1,2-propanediol and mercaptosuccinic acid was equal to the number of moles of the glycidyl methacrylate, and the pH of the aqueous solution was adjusted to 7 by using triethylamine (Kishida Chemical Co., Ltd.) and a 2N aqueous hydrochloric acid solution) was added, and the resulting mixture was maintained at room temperature for three hours under stirring at 200 rpm. The pH of the content in the 200 mL flask was then adjusted to 10 by using triethylamine Subsequently, the temperature was increased to 70° C., and the mixture was further maintained for three hours under stirring at 200 rpm to thereby obtain particles 1 having, as reactive functional groups, carboxyl groups produced by causing epoxy groups derived from glycidyl methacrylate to chemically react with thiol groups derived from 3-mercapto-1,2-propanediol and with thiol groups derived from mercaptosuccinic acid. During the chemical reaction, aggregates or the like were not generated. The particles 1 were purified by a centrifugal operation and stored after the dispersion medium was replaced with a phosphate buffer solution (the replacement of the dispersion medium was also performed by a centrifugal operation). The particles 1 were evaluated by dynamic light-scattering (DLS-8000: Otsuka Electronics Co., Ltd.). According to the results, the particles 1 had a number-average particle size of 232 nm.

Example 2

Synthesis of Particles 2

Particles 2 having carboxyl groups as reactive functional groups were obtained by experimental procedures similar to those in Example 1 except that styrene in Example 1 was changed to methyl methacrylate (Tokyo Chemical Industry Co., Ltd.). During the chemical reaction, aggregates or the like were not generated as in Example 1. Purification and storage were also performed by similar methods. The particle size of the particles 2 was evaluated by a dynamic light-scattering method (DLS-8000: Otsuka Electronics Co., Ltd.). According to the results, the particles 2 had a number-average particle size of 286 nm.

Example 3

Synthesis of Particles 3

In a 200 mL flask, 1.2 g of styrene (Kishida Chemical Co., Ltd.), 1.8 g of glycidyl methacrylate (Kishida Chemical Co., Ltd.), 0.04 g of divinylbenzene (Kishida Chemical Co., Ltd.), and 100 g of ion-exchanged water were weighed to prepare a liquid mixture. Subsequently, the liquid mixture was maintained at 70° C. under stirring at 200 rpm, and nitrogen bubbling was performed for 30 minutes. Next, the nitrogen bubbling was switched to a nitrogen flow, and a solution that had been separately prepared by dissolving 0.06 g of V-50 (FUJIFILM Wako Pure Chemical Corporation) in 3 g of pure water was added to the liquid mixture to initiate radical polymerization (soap-free emulsification polymerization). After two hours from the initiation of the polymerization, 0.3 g of glycidyl methacrylate was added to the radical polymerization reaction field, and the resulting reaction mixture was further maintained at 70° C. for eight hours under stirring at 200 rpm and then slowly cooled to room temperature. At this time, the content in the 200 mL flask was sampled, and the radical polymerization conversion was evaluated by proton NMR, gas chromatography, and gel permeation chromatography. According to the results, it was confirmed that the radical polymerization conversion was substantially 100%. Next, an aqueous solution that had been prepared in advance by dissolving 3-amino-1,2-propanediol (Tokyo Chemical Industry Co., Ltd.) and aminosuccinic acid (where the ratio of 3-amino-1,2-propanediol to aminosuccinic acid was 9:1 (mole fraction), the total number of moles of 3-amino-1,2-propanediol and aminosuccinic acid was equal to the number of moles of the glycidyl methacrylate, and the pH of the aqueous solution was adjusted to 7 by using triethylamine (Kishida Chemical Co., Ltd.) and a 2N aqueous hydrochloric acid solution) was added, and the resulting mixture was maintained at room temperature for three hours under stirring at 200 rpm. The pH of the content in the 200 mL flask was then adjusted to 10 by using triethylamine Subsequently, the temperature was increased to 70° C., and the mixture was further maintained for three hours under stirring at 200 rpm to thereby obtain particles 3 having, as reactive functional groups, carboxyl groups produced by causing epoxy groups derived from glycidyl methacrylate to chemically react with amino groups derived from 3-amino-1,2-propanediol and with amino groups derived from 2-aminosuccinic acid. During the chemical reaction, a considerable amount of aggregates were generated. Accordingly, the aggregates were removed by decantation, and the particles 3 were then purified by a centrifugal operation and stored after the dispersion medium was replaced with a phosphate buffer solution (the replacement of the dispersion medium was also performed by a centrifugal operation). The particles 3 were evaluated by dynamic light-scattering (DLS-8000: Otsuka Electronics Co., Ltd.). According to the results, the particles 3 had a number-average particle size of 235 nm.

Example 4

Synthesis of Particles 4

Particles 4 having carboxyl groups as reactive functional groups were obtained by experimental procedures similar to those in Example 1 except that the ratio of 3-mercapto-1,2-propanediol to mercaptosuccinic acid in Example 1 was changed to 8:2 (mole fraction). During the chemical reaction, aggregates or the like were not generated as in Example 1. Purification and storage were also performed by similar methods. The particle size of the particles 4 was evaluated by a dynamic light-scattering method (DLS-8000: Otsuka Electronics Co., Ltd.). According to the results, the particles 4 had a number-average particle size of 248 nm.

Example 5

Synthesis of Particles 5

Particles 5 having carboxyl groups as reactive functional groups were obtained by experimental procedures similar to those in Example 1 except that the ratio of 3-mercapto-1,2-propanediol to mercaptosuccinic acid in Example 1 was changed to 7:3 (mole fraction). During the chemical reaction, aggregates or the like were not generated as in Example 1. Purification and storage were also performed by similar methods. The particle size of the particles 5 was evaluated by a dynamic light-scattering method (DLS-8000: Otsuka Electronics Co., Ltd.). According to the results, the particles 5 had a number-average particle size of 276 nm.

Example 6

Synthesis of Particles 6

Particles 6 having carboxyl groups as reactive functional groups were obtained by experimental procedures similar to those in Example 1 except that mercaptosuccinic acid in Example 1 was changed to 3-mercaptopropionic acid. During the chemical reaction, aggregates or the like were not generated as in Example 1. Purification and storage were also performed by similar methods. The particle size of the particles 6 was evaluated by a dynamic light-scattering method (DLS-8000: Otsuka Electronics Co., Ltd.). According to the results, the particles 6 had a number-average particle size of 251 nm.

Example 7

Synthesis of Particles 7

Particles 7 having thiol groups as reactive functional groups were obtained by experimental procedures similar to those in Example 1 except that mercaptosuccinic acid in Example 1 was changed to DL-dithiothreitol. During the chemical reaction, aggregates or the like were not generated as in Example 1. Purification and storage were also performed by similar methods. The particle size of the particles 7 was evaluated by a dynamic light-scattering method (DLS-8000: Otsuka Electronics Co., Ltd.). According to the results, the particles 7 had a number-average particle size of 268 nm.

Example 8

Synthesis of Particles 8

Particles 7 having thiol groups as reactive functional groups were obtained by experimental procedures similar to those in Example 1 except that mercaptosuccinic acid in Example 1 was changed to ethylenediamine. During the chemical reaction, aggregates or the like were not generated as in Example 1. Purification and storage were also performed by similar methods. The particle size of the particles 8 was evaluated by a dynamic light-scattering method (DLS-8000: Otsuka Electronics Co., Ltd.). According to the results, the particles 8 had a number-average particle size of 225 nm.

Comparative Example 1

Synthesis of Modified SG Particles

In a 200 mL flask, 1.2 g of styrene (Kishida Chemical Co., Ltd.), 1.8 g of glycidyl methacrylate (Kishida Chemical Co., Ltd.), 0.04 g of divinylbenzene (Kishida Chemical Co., Ltd.), and 100 g of ion-exchanged water were weighed to prepare a liquid mixture. Subsequently, the liquid mixture was maintained at 70° C. under stirring at 200 rpm, and nitrogen bubbling was performed for 30 minutes. Next, the nitrogen bubbling was switched to a nitrogen flow, and a solution that had been separately prepared by dissolving 0.06 g of V-50 (FUJIFILM Wako Pure Chemical Corporation) in 3 g of pure water was added to the liquid mixture to initiate radical polymerization (soap-free emulsification polymerization). After two hours from the initiation of the polymerization, 0.3 g of glycidyl methacrylate was added to the radical polymerization reaction field, and the resulting reaction mixture was further maintained at 70° C. for eight hours under stirring at 200 rpm and then slowly cooled to room temperature. At this time, the content in the 200 mL flask was sampled, and the radical polymerization conversion was evaluated by proton NMR, gas chromatography, and gel permeation chromatography. According to the results, it was confirmed that the radical polymerization conversion was substantially 100%. Next, an aqueous solution that had been prepared in advance by dissolving glycine (where the number of moles of glycine was 1/10 moles relative to the number of moles of the glycidyl methacrylate, and the pH of the aqueous solution was adjusted to 7 by using triethylamine (Kishida Chemical Co., Ltd.) and a 2N aqueous hydrochloric acid solution) was added. Subsequently, the resulting mixture was maintained at room temperature for three hours under stirring at 200 rpm, and the pH of the content in the 200 mL flask was adjusted to 10 by using triethylamine Subsequently, the temperature was increased to 70° C., and the mixture was further maintained for three hours under stirring at 200 rpm to cause epoxy groups derived from glycidyl methacrylate to chemically react with amino groups derived from glycine. Next, the pH of the content in the 200 mL flask was adjusted to 1.5 by using a 2N aqueous hydrochloric acid solution, and the resulting mixture was further maintained at 70° C. for three hours under stirring at 200 rpm. Thus, unreacted epoxy groups were caused to chemically react with water to convert the epoxy groups to a glycol. As a result, modified SG particles having carboxyl groups as reactive functional groups were obtained. During the chemical reaction, a considerable amount of aggregates were generated. Accordingly, the aggregates were removed by decantation, and the modified SG particles were then purified by a centrifugal operation and stored after the dispersion medium was replaced with a phosphate buffer solution (the replacement of the dispersion medium was also performed by a centrifugal operation). The modified SG particles were evaluated by dynamic light-scattering (DLS-8000: Otsuka Electronics Co., Ltd.). According to the results, the modified SG particles had a number-average particle size of 213 nm.

Comparative Example 2

Synthesis of Particles 8

In a 200 mL flask, 1.2 g of styrene (Kishida Chemical Co., Ltd.), 1.8 g of glycidyl methacrylate (Kishida Chemical Co., Ltd.), 0.04 g of divinylbenzene (Kishida Chemical Co., Ltd.), and 100 g of ion-exchanged water were weighed to prepare a liquid mixture. Subsequently, the liquid mixture was maintained at 70° C. under stirring at 200 rpm, and nitrogen bubbling was performed for 30 minutes. Next, the nitrogen bubbling was switched to a nitrogen flow, and a solution that had been separately prepared by dissolving 0.06 g of V-50 (FUJIFILM Wako Pure Chemical Corporation) in 3 g of pure water was added to the liquid mixture to initiate radical polymerization (soap-free emulsification polymerization). After two hours from the initiation of the polymerization, 0.3 g of glycidyl methacrylate was added to the radical polymerization reaction field, and the resulting reaction mixture was further maintained at 70° C. for eight hours under stirring at 200 rpm and then slowly cooled to room temperature. At this time, the content in the 200 mL flask was sampled, and the radical polymerization conversion was evaluated by proton NMR, gas chromatography, and gel permeation chromatography. According to the results, it was confirmed that the radical polymerization conversion was substantially 100%. Next, an aqueous solution that had been prepared in advance by dissolving 3-mercapto-1,2-propanediol (FUJIFILM Wako Pure Chemical Corporation) and mercaptosuccinic acid (FUJIFILM Wako Pure Chemical Corporation) (where the ratio of 3-mercapto-1,2-propanediol to mercaptosuccinic acid was 9:1 (mole fraction), the total number of moles of 3-mercapto-1,2-propanediol and mercaptosuccinic acid was equal to the number of moles of the glycidyl methacrylate, and the pH of the aqueous solution was adjusted to 10 by using triethylamine (Kishida Chemical Co., Ltd.) and a 2N aqueous hydrochloric acid solution) was added. The resulting mixture was then maintained at room temperature for three hours under stirring at 200 rpm. Furthermore, the temperature was then increased to 70° C., and the mixture was further maintained for three hours under stirring at 200 rpm to thereby obtain particles 8 having, as reactive functional groups, carboxyl groups produced by causing epoxy groups derived from glycidyl methacrylate to chemically react with thiol groups derived from 3-mercapto-1,2-propanediol and with thiol groups derived from mercaptosuccinic acid. During the chemical reaction, monitoring was constantly performed by using a pH meter such that the content in the 200 mL flask maintained a pH of 10, and triethylamine was added according to need. During the chemical reaction, a considerable amount of aggregates were generated, resulting in a significant decrease in the yield.

Comparative Example 3

Synthesis of Particles 9

In a 200 mL flask, 1.2 g of styrene (Kishida Chemical Co., Ltd.), 1.8 g of glycidyl methacrylate (Kishida Chemical Co., Ltd.), 0.04 g of divinylbenzene (Kishida Chemical Co., Ltd.), and 100 g of ion-exchanged water were weighed to prepare a liquid mixture. Subsequently, the liquid mixture was maintained at 70° C. under stirring at 200 rpm, and nitrogen bubbling was performed for 30 minutes. Next, the nitrogen bubbling was switched to a nitrogen flow, and a solution that had been separately prepared by dissolving 0.06 g of V-50 (FUJIFILM Wako Pure Chemical Corporation) in 3 g of pure water was added to the liquid mixture to initiate radical polymerization (soap-free emulsification polymerization). After two hours from the initiation of the polymerization, 0.3 g of glycidyl methacrylate was added to the radical polymerization reaction field, and the resulting reaction mixture was further maintained at 70° C. for eight hours under stirring at 200 rpm and then slowly cooled to room temperature. At this time, the content in the 200 mL flask was sampled, and the radical polymerization conversion was evaluated by proton NMR, gas chromatography, and gel permeation chromatography. According to the results, it was confirmed that the radical polymerization conversion was substantially 100%. Next, an aqueous solution that had been prepared in advance by dissolving aminosuccinic acid was added. In the aqueous solution prepared in advance, the number of moles of aminosuccinic acid was 1/10 moles relative to the number of moles of the glycidyl methacrylate, and the pH of the aqueous solution was adjusted to 7 by using triethylamine (Kishida Chemical Co., Ltd.) and a 2N aqueous hydrochloric acid solution.

Subsequently, the resulting mixture was maintained at room temperature for three hours under stirring at 200 rpm, and the pH of the content in the 200 mL flask was then adjusted to 10 by using triethylamine The temperature was increased to 70° C., and the mixture was further maintained for three hours under stirring at 200 rpm to cause epoxy groups derived from glycidyl methacrylate to chemically react with amino groups derived from aminosuccinic acid. Next, the pH of the content in the 200 mL flask was adjusted to 1.5 by using a 2N aqueous hydrochloric acid solution, and the resulting mixture was further maintained at 70° C. for three hours under stirring at 200 rpm. Thus, unreacted epoxy groups were caused to chemically react with water to convert the epoxy groups to a glycol. As a result, particles 9 having carboxyl groups as reactive functional groups were obtained. During the chemical reaction, monitoring was constantly performed by using a pH meter such that the content in the 200 mL flask maintained a pH of 10, and triethylamine was added according to need. During the chemical reaction, a considerable amount of aggregates were generated, resulting in a significant decrease in the yield.

Example 9

Evaluation of Capability to Suppressing Nonspecific Adsorption

Dispersion liquids were prepared by dispersing the particles 1, 2, 3, 4, 5, 6, 7, and 8 and the modified SG particles in a phosphate buffer solution such that each of the dispersion liquids had a concentration of 0.1% by weight. Next, 60 pt of a chyle containing triolein, lecithin, a free fatty acid, bovine albumin, and a tris buffer solution was added relative to 30 pt of each of the dispersion liquids and stirred. For each of the resulting dispersion liquids immediately after stirring, the absorbance at a wavelength of 572 nm was measured. The absorbance was measured by using a spectrophotometer GeneQuant 1300 manufactured by Biochrom Ltd. After these dispersion liquids were left to stand at 37° C. for five minutes, the absorbance at a wavelength of 572 nm was again measured, and an amount of change in the absorbance $\Delta ABS \times 10,000$ was calculated. According to the results, the values of $\Delta ABS \times 10,000$ of the particles 1, the particles 2, the particles 3, the particles 4, the particles 5, the particles 6, the particles 7, the particles 8, and the modified SG particles were 30, 50, 103, 68, 95, 86, 105, 73, and 562, respectively. The change in the absorbance of a dispersion liquid is considered to be attributable to agglutination between particles as a result of the occurrence of nonspecific adsorption in particles in the dispersion liquid. Accordingly, it was confirmed that the particles in Examples were excellent in the capability to suppressing nonspecific adsorption compared with the SG particles.

Example 10

Synthesis of Affinity Particles*Binding of Antibody

Dispersion liquids each having a volume of 1 μL were prepared by dispersing the particles 1, 2, 3, 4, 5, and 6 and the modified SG particles in a phosphate buffer solution such that each of the dispersion liquids had a concentration of 1.0% by weight. A solution prepared by dissolving 0.055 mg of 1-[3-(dimethylaminopropyl)-3-ethylcarbodiimide] (FUJI-FILM Wako Pure Chemical Corporation) in 10 μL of a phosphate buffer solution was added to each of the dispersion liquids. Subsequently, 5 μL of a 4.9 mg/mL dispersion liquid of clone C5 (Funakoshi Co., Ltd.) and 5 μL of a 5.8 mg/mL dispersion liquid of clone C6 (Funakoshi Co., Ltd.) of monoclonal mouse anti-human C-reactive protein (hereinafter, CRP antibody) were added. Subsequently, each of the resulting dispersion liquids was shaken at room temperature for 180 hours to synthesize affinity particles. Next, the affinity particles were purified by performing centrifugal purification (15,000 rpm) three times and finally stored in a state in which it dispersed in 1 mL of a phosphate buffer solution. Hereinafter, the affinity particles obtained from the particles 1 to 6 are expressed as affinity particles 1 to 6, respectively. The affinity particles obtained from the modified SG particles are expressed as CRP-immobilized modified SG particles. The amount of CRP antibody bound to the affinity particles 1 was 1,204 antibodies/particle, the amount of CRP antibody bound to the affinity particles 2 was 1,308 antibodies/particle, and the amount of CRP antibody bound to the affinity particles 3 was 1,157 antibodies/particle. The amount of CRP antibody bound to the affinity particles 4 was 1,402 antibodies/particle, the amount of CRP antibody bound to the affinity particles 5 was 1,607 antibodies/particle, and the amount of CRP antibody bound to the affinity particles 6 was 504 antibodies/particle. The amount of CRP antibody bound to the CRP-immobilized modified SG particles was 295 antibodies/particle. It was found that, in general, particles including a repeating unit having two carboxyl groups in a side chain exhibited better reaction efficiency in the CRP antibody binding reaction than particles including a repeating unit having one carboxyl group in a side chain.

(Example 11, Evaluation of Antigen-Antibody Reactivity against Human CRP Antigen)

A liquid mixture was prepared by mixing 1 μL of human CRP (C4063 manufactured by Sigma-Aldrich Co. LLC., C-reactive protein derived from human plasma, 32 m/dL) and 50 μL of a buffer solution (CRP-L, Denka Company Limited, buffer solution (R-1) of Auto "TBA") and heated at 37° C. for five minutes. Next, 50 μL of a dispersion liquid of affinity particles obtained in Example 7 and the above liquid mixture were mixed and stirred. For the resulting dispersion liquid immediately after stirring, the absorbance at a wavelength of 572 nm was measured. The absorbance was measured by using a spectrophotometer GeneQuant 1300 manufactured by Biochrom Ltd. After the dispersion liquid was left to stand at 37° C. for five minutes, the absorbance at a wavelength of 572 nm was again measured, and an amount of change in the absorbance ΔABS×10,000 was calculated. The affinity particles 1 to 6 and the CRP-immobilized modified SG particles were evaluated. According to the results, the values of ΔABS×10,000 of the affinity particles 1 to 6 and the CRP-immobilized modified SG particles were 5,840, 2,456, 4,401, 3,517, 2,517, 1,820, and 839, respectively. Furthermore, in order to verify whether the change in the absorbance is misleadingly positive or not, the following experiment was performed. A dispersion liquid was prepared by mixing 51 μL of the buffer solution manufactured by Denka Company Limited and 50 μL of a dispersion liquid of affinity particles obtained in Example 7, and stirring the mixture. For the resulting dispersion liquid immediately after stirring, the absorbance at a wavelength of 572 nm was measured. After the dispersion liquid was left to stand at 37° C. for five minutes, the absorbance at a wavelength of 572 nm was again measured, and an amount of change in the absorbance ΔABS×10,000 was calculated. The affinity particles 1 to 6 and the CRP-immobilized modified SG particles were evaluated. According to the results, the values of ΔABS×10,000 of the affinity particles 1, 2, 3, and 6 were substantially zero. Regarding ΔABS×10,000 of the affinity particles 4 and 5, the absorbance slightly increased. The value of ΔABS×10,000 of the CRP-immobilized modified SG particles was 687, which accounted for a large proportion relative to the corresponding positive value (839). These results verified the superiority of the reagent used to detect a target substance in a specimen by in-vitro diagnosis, the reagent being characterized by containing the affinity particles in Examples. Although the amount of CRP antibody bound to the affinity particles 1 and the amount of CRP antibody bound to the affinity particles 2 were substantially equal to each other, a significant difference was observed in the values of ΔABS×10,000. This is considered to be due to X in the repeating unit B. Comparing the case where X is S (sulfide) and the case where X is NH (secondary amine), the NH (secondary amine) provides better solubility of the repeating unit B in water. It is considered that since the affinity particles 2 had excessively good dispersion stability relative to the affinity particles 1, the agglutination reaction between the affinity particles based on the antigen-antibody reaction was unlikely to occur.

As described above, the present invention can provide a particle having a good capability to suppressing nonspecific adsorption and having a functional group for chemically binding a ligand to the surface of the particle, and a novel method for producing the particle simply at a high yield.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. A particle comprising a copolymer including
a repeating unit A, and
a repeating unit B,
wherein the repeating unit A is represented by formula (1-i), and the repeating unit B is represented by formula (2-i):

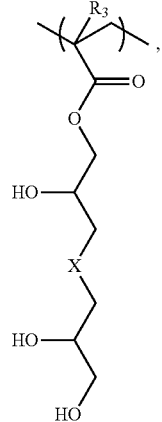

formula (1-i)

-continued

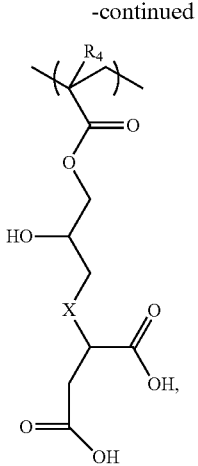

formula (2-i)

where $R_3$ represents H or $CH_3$, and X represents S or NH,
where $R_4$ represents H or $CH_3$, and X represents S or NH.

2. The particle according to claim 1, wherein the copolymer further includes a hydrophobic repeating unit C.

3. The particle according to claim 2, wherein the repeating unit C is at least one selected from repeating units constituting polymers of styrenes and repeating units constituting polymers of (meth)acrylates.

4. An affinity particle comprising the particle according to claim 1 and a ligand bound to a reactive functional group of the particle.

5. The affinity particle according to claim 4, wherein the ligand is any one of an antibody, an antigen, and a nucleic acid.

6. A test reagent for in-vitro diagnosis, comprising the affinity particle according to claim 4 and a dispersion medium in which the affinity particle is dispersed.

7. The test reagent according to claim 6, wherein the ligand is an antibody or an antigen, and the test reagent is used to detect an antigen or an antibody in a specimen by a latex agglutination assay.

8. A test kit for in-vitro diagnosis, comprising the test reagent according to claim 6 and a casing containing the test reagent therein.

9. The particle according to claim 1, wherein the number-average particle size in water have a particle size of 0.05 μm or more and 1 μm.

10. The particle according to claim 1, wherein the number-average particle size in water have a particle size of 0.15 μm or more and 0.3 μm.

11. The particle according to claim 1, wherein a mole fraction of the repeating unit A to the repeating unit B in the particle is 1 or more and 30 or less.

12. The particle according to claim 1, wherein a mole fraction of the repeating unit A to the repeating unit B in the particle is 2 or more and 20 or less.

13. The test reagent according to claim 6, wherein an amount of the affinity particle contained in the test reagent is 0.001% by mass to 20% by mass.

14. The test reagent according to claim 6, wherein an amount of the affinity particle contained in the test reagent is 0.01% by mass to 10% by mass.

15. The test reagent according to claim 6, wherein the test reagent includes at least of phosphate buffer solutions, glycine buffer solutions, Good's buffer solutions, tris buffer solutions, and ammonia buffer solutions.

16. The test reagent according to claim 6, wherein the test reagent includes, as a sensitizer, at least one of polyvinyl alcohol, polyvinylpyrrolidone, and polyalginic acid.

17. The particle according to claim 1, wherein the repeating unit A and the repeating unit B are present on a surface of the particle.

* * * * *